US012654560B2

(12) United States Patent
Haag et al.

(10) Patent No.: US 12,654,560 B2
(45) Date of Patent: Jun. 16, 2026

(54) BRAKE DEVICE FOR A VEHICLE AND METHOD FOR OPERATING A BRAKE DEVICE FOR A VEHICLE

(71) Applicant: Robert Bosch GmbH, Stuttgart (DE)

(72) Inventors: Florian Haag, Ellhofen (DE); Martin Marquart, Reichenbach (DE); Nikolas Loeffelmann, Dielheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 38 days.

(21) Appl. No.: 18/565,800

(22) PCT Filed: May 10, 2022

(86) PCT No.: PCT/EP2022/062565
§ 371 (c)(1),
(2) Date: Nov. 30, 2023

(87) PCT Pub. No.: WO2022/253527
PCT Pub. Date: Dec. 8, 2022

(65) Prior Publication Data
US 2024/0253471 A1 Aug. 1, 2024

(30) Foreign Application Priority Data
Jun. 1, 2021 (DE) ..................... 10 2021 205 578.8

(51) Int. Cl.
*G05D 1/00* (2024.01)
*B60L 7/26* (2006.01)
(Continued)

(52) U.S. Cl.
CPC ............. *B60L 7/26* (2013.01); *B60L 2240/36* (2013.01)

(58) Field of Classification Search
CPC ... B05B 12/122; B05B 13/005; B64C 39/022; B64C 39/024; B64C 2201/027;
(Continued)

(56) References Cited

U.S. PATENT DOCUMENTS 9,246,417 B1 * 1/2016 Connolly .................. H02P 3/14
10,392,018 B1 * 8/2019 Rhodes ................... B60L 58/25
(Continued)

FOREIGN PATENT DOCUMENTS

DE 102016201348 A1 8/2017
DE 102018209311 A1 12/2019
EP 2733030 A1 5/2014

OTHER PUBLICATIONS

International Search Report for PCT/EP2022/062565, Issued Sep. 29, 2022.

*Primary Examiner* — Anne Marie Antonucci
*Assistant Examiner* — Jingli Wang
(74) *Attorney, Agent, or Firm* — NORTON ROSE FULBRIGHT US LLP

(57) ABSTRACT
A brake device for a vehicle. The brake device includes a controller, which is connected to a brake actuator device. The controller is configured to ascertain an operating state of an electric machine in generator mode and a second brake torque, which can be generated by the electric machine, and to operate the brake actuator device in generator mode as a function of the operating state. A specified total brake torque on the vehicle can be generated as the sum of the second brake torque and a first brake torque of the brake actuator device. The controller is configured to reduce or increase the generated first brake torque of the brake actuator device to maintain a specified value range of an operating parameter of the brake actuator device and/or to provide, together with the second brake torque, at least the specified total brake torque on the vehicle.

8 Claims, 1 Drawing Sheet

(51) Int. Cl.
  *B64C 39/02*  (2023.01)
  *G05D 1/222*  (2024.01)

(58) Field of Classification Search
  CPC .......... B64C 2201/12; B64C 2201/127; B64C
  2201/148; B64D 47/08
  See application file for complete search history.

(56)  References Cited

U.S. PATENT DOCUMENTS

| | | | |
|---|---|---|---|
| 10,723,229 B1 | 7/2020 | Yao et al. | |
| 2016/0257297 A1* | 9/2016 | Oshiumi | ................ B60L 58/15 |
| 2019/0092174 A1 | 3/2019 | Lee | |
| 2020/0122728 A1* | 4/2020 | Murase | .................... B60L 7/18 |
| 2020/0324744 A1* | 10/2020 | Mizusaki | ............. B60T 13/686 |

* cited by examiner vehicle

EM — electric machine controller

SE

10

BA — actuator device on-board power supply

BN controller

SE actuator device

BA pedal sensor

PS temperature sensor

TS electric machine

EM detect need to carry out braking action

S1 ascertain operating of the electric machine

S2 generate first brake torque

S3

BRAKE DEVICE FOR A VEHICLE AND METHOD FOR OPERATING A BRAKE DEVICE FOR A VEHICLE

FIELD

The present invention relates to a brake device for a vehicle and to a method for operating a brake device for a vehicle.

BACKGROUND INFORMATION

Typical drive concepts for electrically operated vehicles can resort to a braking effect of the electric machine. Conventional in this respect are brake force generators or brake boosters, which can be actuated electronically when a braking operation is requested. In this case, it can be possible that these devices can be degraded in special situations, e.g., at increased temperature or at increased or reduced voltage. The degradation can in this case be a limitation of operability.

Despite degradation, use can be possible if a specification for a braking operation can at least partially be achieved.

In its operating states, a brake actuator can be either fully functional, degraded with a certain and specified minimum operation or completely switched off.

German Patent Application No. DE 10 2016 201 348 A1 describes a method for operating a creep mode in a motor vehicle.

SUMMARY

The present invention provides a brake device for a vehicle and a method for operating a brake device for a vehicle.

Preferred developments of the present invention are disclosed herein.

The idea on which the present invention is based is to specify a brake device for a vehicle and a method for operating a brake device for a vehicle, wherein availability of a brake actuator device can be increased. In doing so, an operating state of the brake actuator device can be taken into consideration in an improved manner, a regenerative brake torque can be utilized and an operation of the brake device can be adjusted in such a way that a lifetime of the brake actuator device can be prolonged.

In this case, it is advantageously possible that a current capability of an electric machine as a generator is considered with its operability. This can be considered when selecting the degradation of the operation of the brake actuator device. The term "degradation" can in this case relate to any discernible manner of throttling or reducing the operation or functionality of the brake actuator device and/or of other components in the vehicle. In so doing, a deceleration proportion (proportion of the brake torque) that the generator contributes can be considered and the brake actuator can additionally be degraded.

According to an example embodiment of the present invention, the brake device for a vehicle, by means of which a braking action of the vehicle can be controlled, includes a brake actuator device; a controller, which is connected to and/or comprised in the brake actuator device, wherein the controller can furthermore be connected to an electric machine of the vehicle and is configured to ascertain an operating state of the electric machine in generator mode and a second brake torque, which can be generated by the electric machine, and to operate the brake actuator device in generator mode as a function of the operating state of the electric machine, wherein at least one specified total brake torque on the vehicle can be generated as the sum of the second brake torque of the electric machine and a first brake torque of the brake actuator device, and the controller is furthermore configured to ascertain and vary at least one operating parameter for an operation of the brake actuator device in order to thereby reduce or increase the generated first brake torque of the brake actuator device in order to maintain a specified value range of the operating parameter and/or in order to provide, together with the second brake torque, at least the specified total brake torque on the vehicle.

The braking action can be a braking operation on the vehicle in order to slow a rotation of wheels, for example by means of a friction brake torque and/or a regenerative brake torque and/or any other type of brake force on the vehicle.

In this case, a deceleration according to a specification on the vehicle can be achieved or aimed at, wherein the specification can also be selectable to be arbitrarily low or high (strong) by the user. The brake actuator device can be a friction brake of any type, or any other type of conventional or other non-regenerative brake.

In this case, according to an example embodiment of the present invention, the operating state of the electric machine as a generator can be ascertained, which can correspond to the extent to which the electric machine can apply a regenerative brake torque at the moment or in general, e.g., for a velocity range provided, at a particular driving performance, at a particular temperature, at an estimable available battery charge/power as well as further operation-specific parameters for an electric vehicle. Depending on knowledge of the capability of the electrical machine as a generator and thus as a device generating a regenerative brake torque, the first brake torque can then be increased and/or reduced, for example in an adaptively adjustable and dynamic manner over time, in order to at least to some extent achieve a specification for a minimum brake torque, for example a minimum brake torque that can always be retrievable for the vehicle and that can be a sum of the first and second brake torques, or one of these individually.

According to an example embodiment of the present invention, an operating parameter to be ascertained and varied for this purpose for an operation of the brake actuator device can be any type of parameter that can be relevant to this respective brake actuator device for the mode of action thereof. In order to achieve a specification of a braking effect at least to some extent, this or several operating parameters can then be assigned a respective corresponding value range or value, which may be necessary to achieve the specification with, for example, a particular tolerance.

In this case, according to an example embodiment of the present invention, the consideration of the generator capabilities for the degradation of a brake actuator can advantageously be used.

In other words, it can be estimated what proportion of the specification for the total brake torque on the vehicle can be provided by the generator at all times or in a current situation (to be estimated), and to what proportion the first brake torque can then be reduced. Such a reduction of the first brake torque can then have the result that a particular or several operating parameters of the brake actuator device can be varied, for example in order to reduce the first brake torque and to reduce an operating load of the brake actuator device. This can advantageously occur in such a way that, at least to some extent, a specification for the total brake torque can still be satisfied. This specification can be specified as a standard, by a manufacturer, and/or by a current user of the vehicle. There is a possible use for all brake actuators that can perform active degradation.

The available generator capability can be limited by various parameters. This is, for example, the charge level of the battery or also the velocity of the vehicle. For this reason, the degradation must be continuously adjusted, taking into consideration the generator capability, so that it respectively matches the current capability of the generator.

For example, a so-called service brake performance can be specified, i.e., a deceleration of 6.43 m/s² with a pedal force of 500 N. The stronger the degradation that can be performed is, the more availability is increased.

By considering the generator proportion in this way, a requirement for the minimum operating mode of the brake actuator can be reduced. In this case, it may be necessary for the brake actuator to know the current capability of the generator. If the brake actuator is not responsible for actuating the generator and a controller is not directly assigned to or present in the generator, the generator capability can be communicated to the brake actuator, for example via an existing communication network (CAN, FlexRay . . . ). For example, if the specification of service brake performance is used as the minimum operation, the brake actuator can be degraded to 3.43 m/s² (with a pedal force of 500 N) rather than to 6.43 m/s² in the case of a generator capability of a deceleration of 3 m/s².

The vehicle can be a car with a drive that may comprise an electric machine.

According to a preferred embodiment of the brake device of the present invention, the brake actuator device comprises a brake booster device and/or a brake system.

The brake system can comprise a friction brake or any other type of non-regenerative brake.

According to a preferred embodiment of the brake device of the present invention, the controller can be connected to an on-board power supply of a vehicle and is configured to ascertain an on-board power supply voltage and to compare it to a specified value and to reduce the first brake torque, wherein an actuation voltage and/or an actuation current of the brake actuator device in the vehicle is reduced in order to reduce the first brake torque, if the on-board power supply voltage drops below a first threshold value.

If the voltage drops below a first threshold value, the current consumption of the brake actuator can be limited. This prevents a still further voltage degradation as a result of the current flow. If the voltage nevertheless drops further to below a second threshold value, the brake actuator can be switched off completely. For this purpose, the specified value can correspond to the full voltage for an operating mode of the on-board power supply or to a minimum value, e.g., 12 V or 6 V, or to the first or second threshold value.

The first and/or second threshold values can serve as the specified value.

For example, the first threshold value can be 6 volts, wherein the first brake torque can be reducible to a predetermined magnitude if a specification for the total brake torque can then still be achieved. The actuation voltage and/or the actuation current of a brake actuator device can be the quantities by means of which the first brake torque is generated. If such a voltage or current is used less, a lower load on the current or voltage for the on-board power supply can then take place. The necessary operating current (to be provided) for the operation of the brake actuator can thereby be reduced. As a result, the on-board power supply load caused is reduced for a degraded brake actuator. Additionally, a second threshold value can also be selected to be even lower since the required power consumption in the degraded state can be smaller. The operating range is increased here up to lower voltages.

According to a preferred embodiment of the brake device of the present invention, the brake actuator device comprises a temperature sensor by means of which an operating temperature of the brake actuator device can be ascertained, wherein the controller is connected to the temperature sensor and is configured to compare the operating temperature to a specified value for the temperature and to operate the brake actuator device as a function of the operating temperature.

In the case of an excess temperature that can be detected by the temperature sensor, further heating of the brake actuator (+ possibly switch-off of the brake actuator if a switch-off temperature is exceeded) can be prevented by the degradation. The specified value of the temperature can then be a defined temperature still to be tolerated, or can already correspond to a switch-off temperature. As a function thereof, the brake actuator device can then be controlled, wherein, for example, the first brake torque can be reduced if the specified value for the temperature and/or a tolerance range is exceeded.

By reducing the minimum power, the temperature load can be reduced at the time of degradation. As a consequence, the usable temperature range can be increased without degradation.

Alternatively, or additionally, the operability can be increased up to continuous operability in the degraded range.

The minimum power determines how much the power consumption of the device can be limited. The power consumption, in turn, can be responsible for a temperature increase. If degradation to a lower power consumption takes place, the temperature increase in the degraded state is also reduced. If there is, for example, a particular (final) switch-off threshold and if the aim is a design to achieve this threshold only after a certain time, the device can switch to a degraded state at an earlier threshold. With the current lower in the degraded state as a result of the present invention, the temperature increase in the degraded state can also be slower, i.e., the degradation threshold can be selected to be higher.

It is similar with respect to continuous operability. Continuous operability exists if the switch-off threshold cannot be reached at all. This is the case if the specified maximum ambient temperature and the temperature increase as a result of operation in the degraded state are in total below the switch-off threshold. If the temperature increase in the degraded state is smaller, a higher temperature than the maximum ambient temperature is possible, or if the specification is constant, it may happen that the state improves such that a system in which there is no continuous operability suddenly becomes continuously operable.

According to an example embodiment of the present invention, in the method for operating a brake device for a vehicle in order to control a braking action of the vehicle, the following takes place; detecting a need to carry out a braking action with the brake device according to the present invention; ascertaining an operating state on the electric machine and, therefrom, a generatable second brake torque on the electric machine in generator mode and comparing this generatable second brake torque to a specified total brake torque on a vehicle;

generating a first brake torque by means of the brake actuator device and the second brake torque by means of the electric machine together as the total brake torque on the vehicle, wherein an operating parameter for an operation of the brake actuator device is adjusted, thereby reducing or increasing the first brake torque of the brake actuator device in order to provide, together with the second brake torque, at least the specified total brake torque on the vehicle.

The need can be detected from a pedal actuation of the driver or by a sensor system on the vehicle, wherein the sensor system can sense a command of the driver and/or the traffic conditions.

The specified total brake torque can be a brake torque to be at least achieved, or a brake torque required for a current situation.

According to a preferred embodiment of the method of the present invention, at least one operating parameter for an operation of the brake actuator device is ascertained and varied, thereby reducing the first brake torque of the brake actuator device in order to maintain a specified value range of the operating parameter.

According to a preferred embodiment of the method of the present invention, a currently generatable maximum second brake torque is ascertained and the first brake torque is reduced to such an extent that the specified total brake torque on the vehicle is still achieved.

A current available second brake torque can be ascertained and/or a second brake torque available in the foreseeable future can also be estimated.

According to a preferred embodiment of the method of the present invention, a voltage and/or a current at an on-board power supply of the vehicle is ascertained and the first brake torque is reduced, wherein an actuation voltage and/or an actuation current of the brake actuator device in the vehicle is reduced in order to reduce the first brake torque.

There can be a general adjustment to the actuation voltage and/or the actuation current.

According to a preferred embodiment of the method of the present invention, the voltage at the on-board power supply is ascertained and, if the voltage at the on-board power supply drops below a first threshold value, the actuation voltage and/or an actuation current of the brake actuator device is limited and, if the voltage at the on-board power supply drops below a second threshold value, the brake actuator device is switched off when the second brake torque itself reaches the specified total brake torque on the vehicle.

If the voltage drops below a first threshold value, the current consumption of the brake actuator is limited. This prevents a still further voltage degradation as a result of the current flow. If the voltage nevertheless drops further to below a second threshold value, the brake actuator can be switched off completely. As a result, the necessary operating current for the operation of the brake actuator can be reduced. As a result, the on-board power supply load caused is reduced for a degraded brake actuator. Additionally, the second threshold value can also be selected to be lower since the required power consumption in the degraded state is smaller. The operating range is increased here up to lower voltages.

According to a preferred embodiment of the method of the present invention, an operating temperature of the brake actuator device is ascertained by a temperature sensor and the first brake torque is reduced if the operating temperature exceeds a predetermined value.

According to a preferred embodiment of the method of the present invention, the operating state on the electric machine and the second brake torque that can be generated therefrom on the electric machine are ascertained continuously or at specified time intervals.

The brake device of the present invention can also be characterized by the features mentioned in connection with the method of the present invention and by the advantages of the method of the present invention, and vice versa.

Further features and advantages of embodiments of the present invention arise from the following description with reference to the figures.

BRIEF DESCRIPTION OF THE DRAWINGS

The present invention is explained in greater detail below with reference to the exemplary embodiments indicated in the schematic figures.

In the figures, identical reference signs denote identical or functionally identical elements.

DETAILED DESCRIPTION OF EXAMPLE EMBODIMENTS

Figure 1:
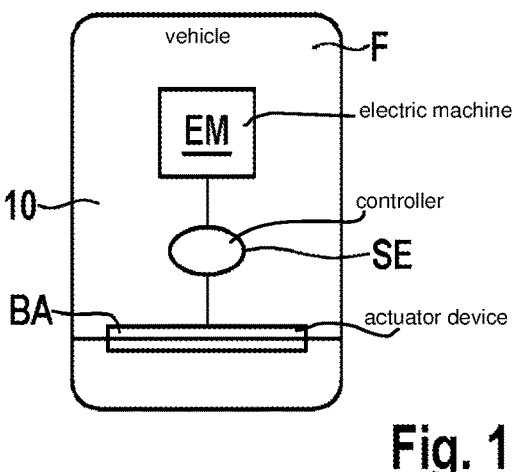
FIG. 1 shows a schematic representation of a brake device for a vehicle according to an exemplary embodiment of the present invention.

FIG. 1 shows a schematic representation of a brake device for a vehicle according to an exemplary embodiment of the present invention.

The brake device 10 for a vehicle F, by means of which a braking action of the vehicle can be controlled, comprises a brake actuator device BA; a controller SE, which is connected to and/or comprised in the brake actuator device BA, wherein the controller SE can furthermore be connected to an electric machine EM of the vehicle F and is configured to ascertain an operating state of the electric machine EM in generator mode and a second brake torque, which can be generated by the electric machine EM, and to operate the brake actuator device BA in generator mode as a function of the operating state of the electric machine EM, wherein at least one specified total brake torque on the vehicle F can be generated as the sum of the second brake torque of the electric machine and a first brake torque of the brake actuator device BA, and the controller SE is furthermore configured to ascertain and vary at least one operating parameter for an operation of the brake actuator device BA in order to thereby reduce or increase the generated first brake torque of the brake actuator device BA in order to maintain a specified value range of the operating parameter and/or in order to provide, together with the second brake torque, at least the specified total brake torque on the vehicle F.

Figure 2:
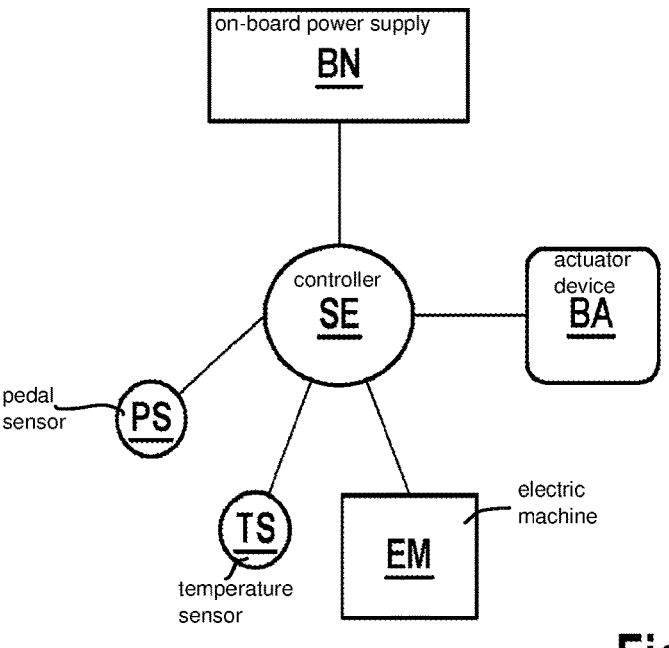
FIG. 2 shows a schematic representation of a brake device according to an exemplary embodiment of the present invention in a vehicle.

FIG. 2 shows a schematic representation of a brake device according to an exemplary embodiment of the present invention in a vehicle.

FIG. 2 shows further components and interconnections between the components, as can additionally or alternatively be present in the embodiment of FIG. 1.

In this respect, the brake device 10 can be designed in such a way that the controller SE can be connected to an on-board power supply BN of the vehicle and is configured to ascertain an on-board power supply voltage and to compare it to a specified value and to reduce the first brake torque, wherein an actuation voltage and/or an actuation current of a brake actuator device BA in the vehicle is reduced in order to reduce the first brake torque, if the on-board power supply voltage drops below a first threshold value. The brake actuator device BA can comprise a temperature sensor TS and/or the controller SE can be connected to the temperature sensor TS, by means of which an operating temperature of the brake actuator device BA can be ascertained, wherein the controller SE is configured to compare the operating temperature to a specified value for the temperature and to operate the brake actuator device as a function of the operating temperature.

The brake actuator device BA can comprise a pedal sensor PS and/or the controller SE can be connected to the pedal sensor PS, by means of which a braking request can be detectable.

Figure 3:
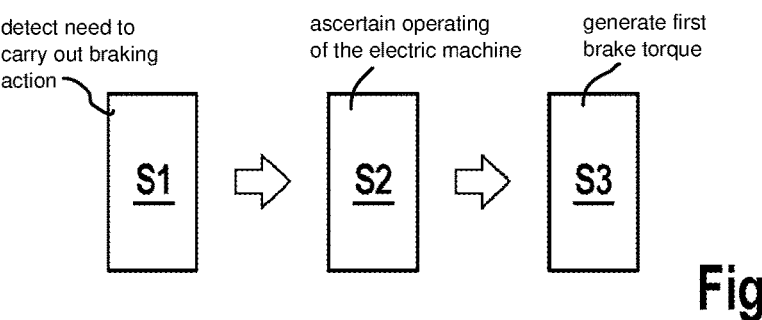
FIG. 3 shows a block diagram of method steps of the method for operating a brake device for a vehicle according to an exemplary embodiment of the present invention.

FIG. 3 shows a block diagram of method steps of the method for operating a brake device for a vehicle according to an exemplary embodiment of the present invention.

In the method for operating a brake device for a vehicle, the following takes place; detecting S1 a need to carry out a braking action with the brake device according to the present invention; ascertaining S2 an operating state on the electric machine and, therefrom, a generatable second brake torque on the electric machine in generator mode and comparing this generatable second brake torque to a specified total brake torque on a vehicle; generating S3 a first brake torque by means of the brake actuator device and the second brake torque by means of the electric machine together as the total brake torque on the vehicle, wherein an operating parameter for an operation of the brake actuator device is adjusted, thereby reducing or increasing the first brake torque of the brake actuator device in order to provide, together with the second brake torque, at least the specified total brake torque on the vehicle.

Although the present invention has been completely described above with reference to the preferred exemplary embodiment, it is not limited thereto but can be modified in many ways.

The invention claimed is:

1. A brake device for a vehicle using which a braking action of the vehicle can be controlled, the brake device comprising:
   a brake actuator device; and
   a controller which is connected to and/or included in the brake actuator device, the controller further being connectable to an electric machine of the vehicle and is configured to ascertain an operating state of the electric machine in a generator mode, and a second brake torque, which can be generated by the electric machine, and to operate the brake actuator device in the generator mode as a function of the operating state of the electric machine, wherein at least one specified total brake torque on the vehicle can be generated as a sum of the second brake torque of the electric machine and a first brake torque of the brake actuator device, and the controller is further configured to ascertain and to vary at least one operating parameter for an operation of the brake actuator device to reduce or increase the generated first brake torque of the brake actuator device to: (i) maintain a specified value range of the operating parameter and/or (ii) provide, together with the second brake torque, at least the specified total brake torque on the vehicle, wherein the controller is connected to an on-board power supply of the vehicle, wherein a voltage at the on-board power supply is ascertained and, when the voltage at the on-board power supply drops below a first threshold value, an actuation voltage and/or an actuation current of the brake actuator device is limited and, when the voltage at the on-board power supply drops below a second threshold value that is lower than the first threshold, the brake actuator device is switched off when the second brake torque by itself reaches the specified total brake torque on the vehicle.

2. The brake device according to claim 1, wherein the brake actuator device includes a brake booster device and/or a brake system.

3. The brake device according to claim 1, wherein the brake actuator device includes a temperature sensor using an operating temperature of the brake actuator device can be ascertained, wherein the controller is connected to the temperature sensor and is further configured to compare the operating temperature to a specified value for the operating temperature and to operate the brake actuator device as a function of the operating temperature.

4. A method for operating a brake device for a vehicle to control a braking action of the vehicle, the method comprising the following steps:
   detecting a need to carry out a braking action with a brake device, the brake device including:
      a brake actuator device, and
      a controller which is connected to and/or included in the brake actuator device, the controller further being connectable to an electric machine of the vehicle;
   ascertaining an operating state on the electric machine and, from the operating state, ascertaining a generatable second brake torque of the electric machine in generator mode, and comparing the generatable second brake torque to a specified total brake torque on a vehicle; and
   generating a first brake torque using the brake actuator device and generating the second brake torque using the electric machine, the first brake torque and the second brake torque being generated together as a total brake torque on the vehicle, wherein an operating parameter for an operation of the brake actuator device is adjusted, thereby reducing or increasing the first brake torque of the brake actuator device to provide, together with the second brake torque, at least the specified total brake torque to the vehicle, wherein the controller is connected to an on-board power supply of the vehicle, wherein a voltage at the on-board power supply is ascertained and, when the voltage at the on-board power supply drops below a first threshold value, an actuation voltage and/or an actuation current of the brake actuator device is limited and, when the voltage at the on-board power supply drops below a second threshold value that is lower than the first threshold, the brake actuator device is switched off when the second brake torque by itself reaches the specified total brake torque on the vehicle.

5. The method according to claim 4, wherein at least one operating parameter for an operation of the brake actuator device is ascertained and varied, to reduce the first brake torque of the brake actuator device to maintain a specified value range of the operating parameter.

6. The method according to claim 4, wherein a currently generatable maximum second brake torque is ascertained, and the first brake torque is reduced to such an extent that the specified total brake torque on the vehicle is still achieved.

7. The method according to claim 4, wherein an operating temperature of the brake actuator device is ascertained by a temperature sensor, and the first brake torque is reduced when the operating temperature exceeds a predetermined value.

8. The method according to claim 4, wherein the operating state on the electric machine and the second brake torque that can be generated by the electric machine based on the operating state are ascertained continuously or at specified time intervals.

* * * * *